Patented Dec. 6, 1927.

1,652,141

UNITED STATES PATENT OFFICE.

HERBERT A. ENDRES, OF AKRON, OHIO, ASSIGNOR TO THE GOODYEAR TIRE & RUBBER COMPANY, OF AKRON, OHIO, A CORPORATION OF OHIO.

METHOD OF COMPOUNDING RUBBER AND PRODUCT OBTAINED THEREBY.

No Drawing.   Application filed September 15, 1923.  Serial No. 662,992.

My invention relates to compounds of rubber and it has, for its primary object, the provision of a method of compounding whereby materials, which have heretofore been considered of negligible value, may be utilized to produce a stock of high quality.

It is well known that in order to produce a high grade rubber compound or a compound composed of rubber and a filling material, that it is necessary to utilize a filling material which may be obtained in very finely divided form and uniformly dispersed throughout the rubber. Gas black or carbon black has heretofore been considered one of the best materials as a compounding agent, since it may be very well dispersed through the rubber and may be obtained in finely divided form. However, carbon black presents difficulties in handling and, moreover, since the present day consumption thereof disposes of large quantities, the material has become relatively expensive.

One of the objects of my invention resides in utilizing a method of compounding a relatively inexpensive filling material with rubber in such manner that a high grade stock, such as that produced from carbon black and rubber, may be obtained.

There are, of course, other compounding agents than carbon black, but all of them are relatively expensive and possess other disadvantages which preclude their being considered ideal materials. Zinc oxide, for example, produces a good grade of rubber stock, but this material is relatively expensive, and moreover, rubber articles having zinc oxide incorporated therein are relatively heavy and the rubber stock does not possess the tensile strength nor resistance to abrasion that a stock formed by employing carbon black possesses. Consequently, most compounding agents or fillers are compared in quality with carbon black, since it apparently produces one of the best qualities of rubber stock.

Various materials may be utilized in accordance with my invention that may be purchased on the market at a much lower cost than carbon black, and present desirable features in the matter of handling a material previous to its incorporation in a compound. One of the principal materials, however, is barium sulphate or barytes ($BaSO_4$). This material has heretofore been considered of little or no value as a compounding agent because it is difficult, by ordinary methods, to reduce it to a sufficiently finely divided form and to disperse it uniformly through rubber when compounded therewith. However, by my method, the material may be easily produced in a sufficiently finely divided form and readily dispersed through rubber, in fact it may be combined with rubber so efficiently that stock produced therefrom compares very favorably with carbon black stock in all of its important characteristics.

In practicing my method, a concentrated solution of sodium sulphate ($Na_2SO_4$) is mixed with a concentrated solution of barium chloride ($BaCl_2$) and the mixture agitated for a few minutes in any suitable vessel, such as a colloidal mill. The barium chloride is preferably in excess of the amount necessary to form barium sulphate ($BaSO_4$) from reaction with the sodium sulphate because the barium chloride is employed not only to form the barium sulphate, but to thereafter react with the barium sulphate as a peptizing agent to create a finely divided precipitate that is well dispersed and further act as a rubber coagulant. In order to obtain a rubber compound, latex may then be added to the mixture while agitation thereof is being carried on in order to give complete dispersion of the barium sulphate in the rubber. The precipitated material may be removed from the liquid by decantation.

The material resulting from the above described method, from microscopic examination, apparently has the filler or barium sulphate dispersed uniformly through the rubber which seems to surround a large number of very finely divided spaced particles of the barytes. It will be observed that the barium chloride serves the double purpose of peptizing the barium sulphate and acting as a rubber coagulant when the latex is added to the mixture. It should be noted that the method not only provides a means for utilizing a relatively cheap filling material, but also permits of the employment of latex in forming a rubber compound. Any process which permits of utilizing latex rather than rubber coagulated therefrom, materially reduces the cost of the rubber.

There are a number of other filling materials that may be employed in substantially the same manner as the barytes which, incidentally, need not be obtained from sodium sulphate by precipitation therefrom. If the barytes is used as such, it is dispersed in water and the concentrated solution of barium chloride mixed therewith. Concentrated solutions are desirable because apparently they facilitate the comminution of the barium sulphate.

Other materials that may be employed are ferric oxide ($Fe_2O_3$) with which the peptizing agent and rubber coagulant is ferric chloride ($FeCl_3$), antimony sulphate ($Sb_2S_5$) with antimony chloride ($SbCl_3$), calcium carbonate ($CaCO_3$), which may be obtained from sodium carbonate, with calcium chloride ($CaCl_2$), calcium sulphate ($CaSO_4$), which may be obtained from sodium sulphate ($Na_2SO_4$), with calcium chloride ($CaCl_2$), magnesium carbonate ($MgCO_3$), which may be obtained from sodium carbonate, with magnesium chloride ($MgCl_2$), or lithopone ($BaSO_4 + ZnS$), which may be obtained from zinc sulphate ($ZnSO_4$) with barium sulphide ($BaS$).

It should be noted that the filling materials calcium carbonate, calcium sulphate and barium sulphate represent insoluble salts of an alkaline earth metal, and that their corresponding peptizing agents and rubber coagulants, calcium chloride and barium chloride, are representative of soluble salts of alkaline earth metals. Of course, the insoluble salts are only relatively so and this term is used in the claims with the meaning that is generally attributed thereto by those skilled in the art.

It has been found by tests that the foregoing method of utilizing, for example, barium sulphate, as a filling material, and barium chloride, as a peptizing agent and rubber coagulant, mixed with latex produces a compound, which when properly worked upon a mill, results in a rubber stock that compares very favorably in its properties with those attained in carbon black stock. The barytes, from microscopic examination, seems to be dispersed through the rubber in very finely divided form and the small particles thereof separated by surrounding portions of the rubber. This condition, of course, is one that is generally desired to attain to provide a fine grain high grade stock.

Although I have specifically described a method of compounding rubber and set forth, specifically, various materials that may be utilized in practicing the method, it is obvious that inasmuch as a representative number of materials have been named, the invention should not be restricted to the particular materials set forth, and the claims, consequently, should be interpreted in such manner as to include the basic principles of the invention

What I claim is:

1. A method of compounding rubber that comprises adding a solution of a rubber coagulant containing a filler material which is peptized thereby to a suspension or emulsion of rubber and collecting the coagulated rubber.

2. A method of compounding rubber that comprises adding an insoluble salt of an alkaline earth metal suspended in a solution of a soluble salt of the same metal, admixing a suspension or emulsion of rubber therewith and collecting the coagulated rubber.

3. A method of compounding rubber that comprises admixing a solution of sodium sulfate with a solution of barium chloride and adding a suspension or emulsion of rubber thereto.

4. A method of compounding rubber that comprises admixing a solution of sodium sulfate with a solution of barium chloride, adding latex thereto and subsequently removing the liquid phase.

5. A method of compounding rubber that comprises admixing an excess of barium chloride with sodium sulfate, and adding latex to such mixture, thus coagulating the rubber of the latex.

6. A method of compounding rubber that comprises, precipitating a compounding ingredient in the presence of a solution of a peptizing agent, capable of coagulating rubber, mixing the suspension with a solution or emulsion of rubber and removing the liquid phase.

In witness whereof, I have hereunto signed my name.

HERBERT A. ENDRES.